(12) United States Patent
Callahan

(10) Patent No.: US 12,377,345 B2
(45) Date of Patent: Aug. 5, 2025

(54) METHODS AND SYSTEMS FOR INTERACTIVE GAMING PLATFORM SCENE GENERATION UTILIZING CAPTURED VISUAL DATA AND ARTIFICIAL INTELLIGENCE-GENERATED ENVIRONMENT

(71) Applicant: Michael Callahan, San Francisco, CA (US)

(72) Inventor: Michael Callahan, San Francisco, CA (US)

( * ) Notice: Subject to any disclaimer, the term of this patent is extended or adjusted under 35 U.S.C. 154(b) by 323 days.

(21) Appl. No.: 18/124,104

(22) Filed: Mar. 21, 2023

(65) Prior Publication Data

US 2023/0218984 A1 Jul. 13, 2023

Related U.S. Application Data

(63) Continuation-in-part of application No. 17/888,768, filed on Aug. 16, 2022, now abandoned, which is a continuation of application No. 17/019,812, filed on Sep. 14, 2020, now Pat. No. 11,413,520, which is a
(Continued)

(51) Int. Cl.
| | |
|---|---|
| A63F 13/213 | (2014.01) |
| A63F 13/212 | (2014.01) |
| A63F 13/217 | (2014.01) |
| A63F 13/235 | (2014.01) |
| A63F 13/25 | (2014.01) |
| A63F 13/335 | (2014.01) |
| A63F 13/42 | (2014.01) |
| A63F 13/65 | (2014.01) |

(Continued)

(52) U.S. Cl.
CPC .......... *A63F 13/213* (2014.09); *A63F 13/212* (2014.09); *A63F 13/217* (2014.09); *A63F 13/235* (2014.09); *A63F 13/25* (2014.09); *A63F 13/335* (2014.09); *A63F 13/42* (2014.09); *A63F 13/65* (2014.09); *A63F 13/847* (2014.09); *A63F 13/87* (2014.09)

(58) Field of Classification Search
None
See application file for complete search history.

(56) References Cited

U.S. PATENT DOCUMENTS

| | | | |
|---|---|---|---|
| 10,576,380 B1 * | 3/2020 | Beltran | A63F 13/67 |
| 2023/0056898 A1 * | 2/2023 | Yen | A63F 13/355 |
| 2024/0165509 A1 * | 5/2024 | Flores | A63F 13/40 |

* cited by examiner

*Primary Examiner* — Ronald Laneau
(74) *Attorney, Agent, or Firm* — McAndrews, Held & Malloy, Ltd.

(57) ABSTRACT

Methods and systems are provided for interactive gaming platform scene generation utilizing captured visual data and artificial intelligence-generated environment, with the gaming platform including at least a user device that has or is coupled to a display, with the gaming platform configured to obtain recorded footage associated with an environment pertinent to a game playable via the user device, to generate, based on the recorded footage, one or more video frames for use during playing of the game via the user device, and to display the one or more video frames via the display during the playing of the game via the user device. The recorded footage may be processed using artificial intelligence, and the one or more video frames may be generated using the artificial intelligence and based on the processing of the recorded footage.

21 Claims, 6 Drawing Sheets

Related U.S. Application Data continuation of application No. 16/179,422, filed on Nov. 2, 2018, now Pat. No. 10,773,153.

(60) Provisional application No. 62/580,488, filed on Nov. 2, 2017.

(51) Int. Cl.
*A63F 13/847* (2014.01)
*A63F 13/87* (2014.01)

METHODS AND SYSTEMS FOR INTERACTIVE GAMING PLATFORM SCENE GENERATION UTILIZING CAPTURED VISUAL DATA AND ARTIFICIAL INTELLIGENCE-GENERATED ENVIRONMENT

CLAIM OF PRIORITY AND CROSS-REFERENCE TO RELATED APPLICATIONS

This application is a continuation-in-part (CIP) of U.S. patent application Ser. No. 17/888,768, filed on Aug. 16, 2022, which is a continuation of U.S. patent application Ser. No. 17/019,812, filed on Sep. 14, 2020, now issued U.S. Pat. No. 11,413,520, which is a continuation of U.S. patent application Ser. No. 16/179,422 filed on Nov. 2, 2018, now issued U.S. Pat. No. 10,773,153, which claims priority to, and the benefit of, U.S. Provisional Patent Application 62/580,488 filed on Nov. 2, 2017. Each of the above applications is hereby incorporated herein by reference in its entirety.

TECHNICAL FIELD

Aspects of the present disclosure relate to electronic gaming. More specifically, certain implementations of the present disclosure relate to methods and systems for interactive gaming platform scene generation utilizing captured visual data and artificial intelligence-generated environment.

BACKGROUND

Conventional gaming platforms may be costly, cumbersome, and/or inefficient—e.g., they may be complex and/or time consuming. Further limitations and disadvantages of conventional and traditional approaches will become apparent to one skilled in the art, through comparison of such systems with some aspects of the present disclosure as set forth in the remainder of the present application with reference to the drawings.

BRIEF SUMMARY

Methods and systems are provided for interactive gaming platform scene generation utilizing captured visual data and artificial intelligence-generated environment, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set $\{(x), (y), (x, y)\}$. In other words, "x and/or y" means "one or both of x and y". As another example, "x, y, and/or z" means any element of the seven-element set $\{(x), (y), (z), (x, y), (x, z), (y, z), (x, y, z)\}$. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry or a device is "operable" to perform a function whenever the circuitry or device comprises the necessary hardware and code (if any is necessary) to perform the function, regardless of whether performance of the function is disabled or not enabled (e.g., by a user-configurable setting, factory trim, etc.).

Figure 1:
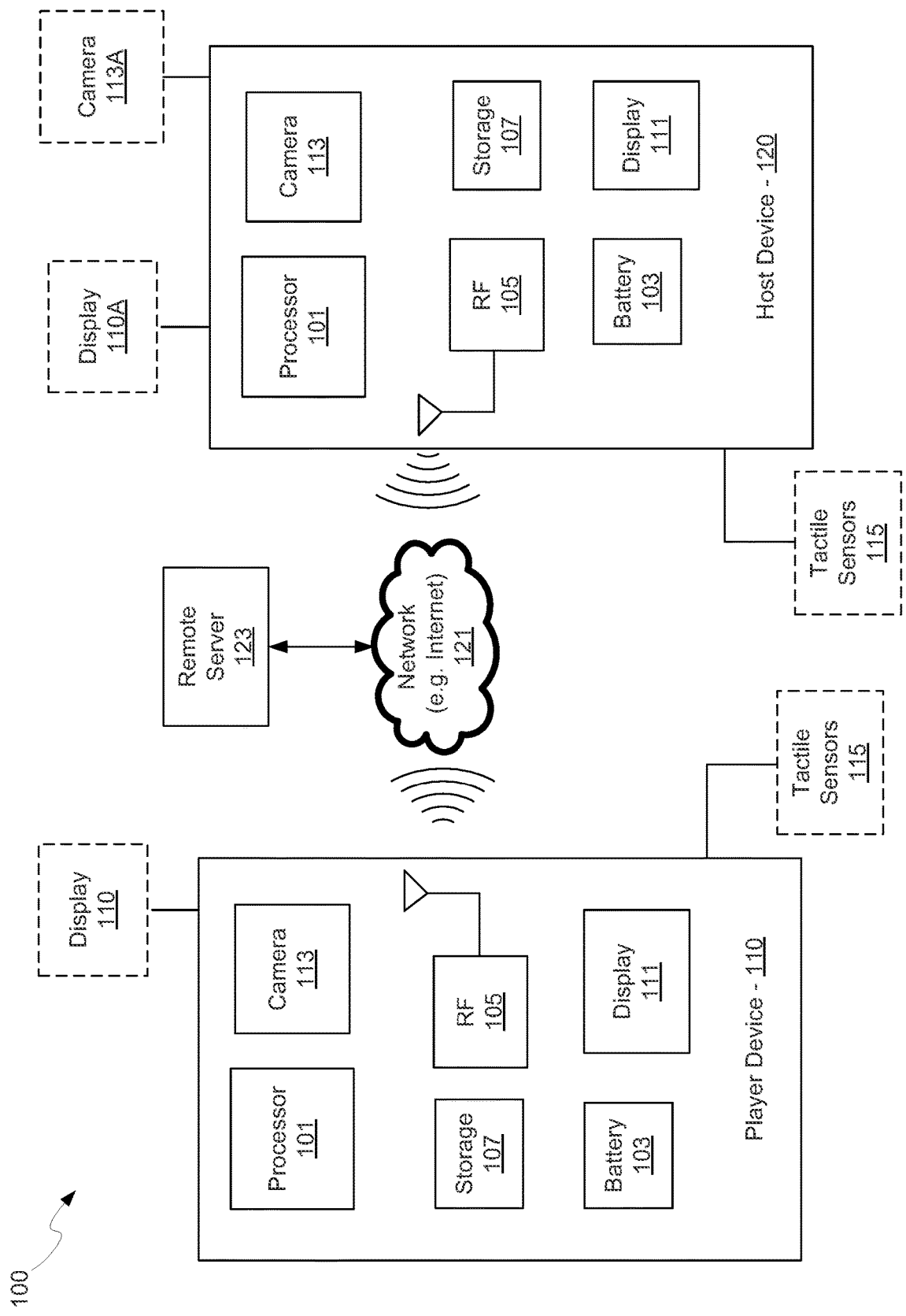
FIG. 1 is a diagram illustrating communication devices for an interactive gaming platform, in accordance with an example embodiment of the disclosure.

FIG. 1 is a diagram illustrating communication devices for a personal interaction game platform, in accordance with an example embodiment of the disclosure. Referring to FIG. 1, there is shown a personal gaming system 100 with a player device 110, a network 121, an optional remote server 123, and a host device 120. The player device 110 may comprise any device used for communication such as a cell phone, tablet, desktop computer, or laptop, for example, with computing and storage capability, although some of such capability may be performed by other devices in communication with the player device 110, while the host device may comprise a mobile device such as a cell phone, tablet, or laptop, for example, and may be coupled to optional display 111A, camera 113A, and tactile sensors 115, and/or other sensing and feedback equipment.

The player device 110 and host device 120 may each comprise a processor 101, a battery 103, a wireless radio frequency (RF) front end 105, storage 107, a display 111, and a camera 113.

The processor 101 may control the operations of the player device 110/host device 120, storing information in the storage 107, enabling communications via the RF front end 105, processing information received via a keyboard or other input mechanism, such as may be configured in the display 111, for example, and other suitable control operations for the player device 110/host device 120. The battery 103 may provide power for the player device 110/host device 120 and the storage 107 may comprise a memory device for storing information. In an example scenario, the storage 107 may store gaming functions, such as command structures for the user of the player device 110/host device 120. The storage 107 may also store photos and/or videos taken by the camera 113.

The RF front end 105 may comprise suitable circuitry for communicating wirelessly with other devices via one or more networks, such as the network 121. The RF front end 105 may therefore communicate utilizing various communications standards, such as GSM, CDMA, LTE, WiFi, Bluetooth, Zigbee, etc., and therefore may comprise one or more antennae, filters, amplifiers, mixers, and analog-to-digital converters, for example.

The camera 113 may comprise one or more imaging sensors and optics for focusing light onto the sensors, and may be operable take pictures and video through operation of the user of the player device 110/host device 120. The host device 120 may also comprise an external camera 113A, such as a small portable camera mounted on the body of the user of the host device 120, hereinafter referred to as the host, to enable a first-person view of gaming activities. In an example scenario, the camera 113A may take video that may be communicated to the player device 110 such that its user, hereinafter referred to as the player, may be presented with the environment in which the user of the host device 120 is located. Similarly, the optional displays 111A may comprise a headset display for providing optical information to the player and/or host. One or more external cameras may be affixed to other devices such as tripods, walls, airborne drones, robots, other people, and/or other stationary and mobile items. The camera information can be augmented with additional information synthesized by a computer. In an example scenario, the camera has infrared camera capabilities and captures information used to estimate the pose of the host and control the rig of a 3D character.

The tactile sensors 115 may be pressure sensitive sensors and actuators that may be operable to provide tactile feedback to the player and/or host. For example, the tactile sensors may comprise micro-electro-mechanical system (MEMS) devices that sense the motion of the player's hand to provide a motion command to the host. In addition, the host's tactile sensors may sense via pressure sensors that the host has touched an object and actuators in the player's tactile sensor may provide pressure to the player's hand in that location to provide tactile feedback. Other examples of sensors in the tactile sensors 115 may include temperature sensors, light sensors, moisture sensors, etc., where the sensing is intended to mimic as much as possible of the host's environment.

The network 121 may comprise any communication system by which the devices communicate with other devices, such as the remote server 123 and the host device 120. As such, the network 121 may comprise the Internet, a local WiFi network, one or more cellular networks, etc.

The remote server 123 may comprise a computing device or devices for assisting in gaming functions between the host device 120 and the player device 110. The remote server 123 may be optional in instances when gaming databases, commands, or functions are stored locally on the player device 110 and/or the host device 120.

A multiplayer game played over the network 121 can be implemented using several different approaches, which can be categorized into two groups: authoritative and non-authoritative. In the authoritative group, a common approach is the client-server architecture, where a central entity, such as the remote server 123, controls the whole game. Every client connected to the server receives data, locally creating a representation of the game state on their device. If a host or player performs or requests an action, such as moving from one point to another, that information is sent to the remote server 123. The server 123 may check whether the information is correct, e.g., did the host move to a stated location, and then updates its game state. After that, it propagates the information to all clients, so they can update their game state accordingly. In the non-authoritative group, there is no central entity and every peer (game) controls its game state. In a peer-to-peer (P2P) approach, a peer sends data to all other peers and receives data from them, assuming that information is reliable and correct. In the present example shown in FIG. 1, each of the player and host would be sending data to the other.

In an example scenario, the host may have the host device 120 mounted on their body in some way, such as with a headset or harness, and/or may include the camera 113A and/or the display 111A external to the host device 120 mounted to the host, for hands free operation and first-person view for the player during gaming. The user of the player device 110 may issue commands to the user where the host device 120 is at a remote location from the player device 110, connected via one or more communication networks, such as the network 121. The host device may be manned or unmanned as is the case where the host device is autonomous and/or robotic.

The commands may be communicated via various techniques other than verbal. For example, different tones may be utilized for instructing the user of the host device 120 to move in different directions, or perform an action, such as pick up or drop an object. In another example scenario, textual or other communicative symbols may be displayed on the display 111A and/or the display 111 of the host device 120 to provide commands to the user of the host device 120. The gaming commands and actions are described further with respect to FIGS. 2 and 3. These commands may also be transmitted to feedback devices of the host for example pressure inducers, motors, and/or direct brain stimulation.

Similarly, the user of the player device 110, or player, may communicate instructions verbally, textually, or graphically through the use of a microphone, touchscreen, keyboard, and/or brain recording device for example, although other inputs may be utilized, such as a joystick, trackpad, or game controller.

Figure 2:
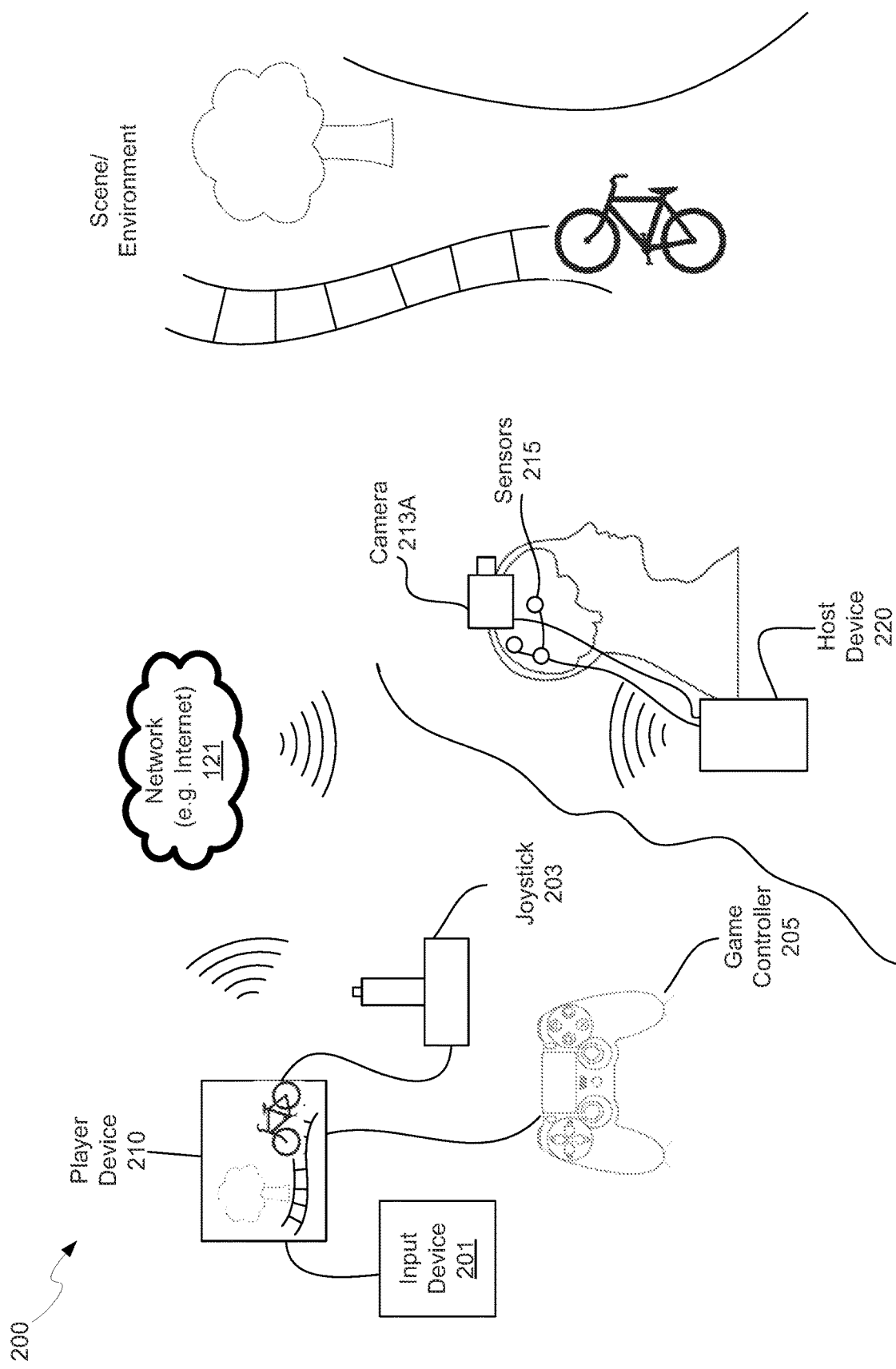
FIG. 2 illustrates an interactive gaming platform, in accordance with an example embodiment of the disclosure.

FIG. 2 illustrates a personal interaction game platform, in accordance with an example embodiment of the disclosure. Referring to FIG. 2, there is shown humaning game platform 200 comprising a player device 210, a host device 220, and network 121. The player device 210 is shown with an input device 201, joystick 203, and a game controller 205, although other accessories are possible. There is also shown host device 220 with a mounted camera 213A and sensors 215. The player device 210 and host device 220 may share any and all features of the player and host devices described with respect to FIG. 1.

The sensors 215 may be similar to the tactile sensors 215, and in this example are shown as attached to the host's head. In this example, various aspects of the host's environment and person may be sensed, such as temperature, sound, sweat, and even brain waves using EEG-type sensors, for example. Sensors may also be mounted elsewhere on the host's body for sensing movement, for example.

The term "humaning" from "human" and "gaming" is a gaming platform where a person may control another person like one would do in a video game. In this manner, reality is mixed with gaming or a digital gaming experience. Video games continue to become more lifelike and true to physics with improved graphics and processing capability. However, in a humaning environment, the graphics and physics are exact, as they are in the real world, because it can take place in the real world at least from the perspective of the host. Furthermore, the simulated intelligence of a character that is sought after in video game design is inherent in humaning environment because they can contain real humans.

A main component of a humaning game platform is low latency video, where it synthesizes and transfers experiences as they occur without delay or glitchiness. In addition, a more direct connection to the brain may be utilized, with virtual reality an intermediate step between these two levels of experience. An objective is to provide as rich an experience as possible, with video, sound, tactile, and even mental impacts/effects.

Other main components of humaning are the host and player, where the host agrees to be controlled or is autonomous and the player uses various levels of controls to do so. Feedback comprises, at least, audio/video but may also include other visual and/or textual inputs.

The commands in a humaning platform may be bidirectional—in that the player can control the host directionally, using a smart phone, drone, GoPro, infrared camera, etc. . . . with live video streamed to the player with a controller, such as a joystick, game controller, or a directional pad. The commands may be transmitted to the host with visual, audible, or tactile feedback. In an example scenario, the host may wear a headset with audio, visual, and tactile inputs and outputs. Verbal instructions may be overlaid with specific tones in audible 3D space to indicate direction using time delays in left/right channels. Tones may also be associated with different instructions, such as "pick up," "open," or "close," for example. Feedback may also be directly or indirectly communicated with the brain via targeted stimulation.

For visual feedback, instructions or directions may be displayed on the hosts display screen, a 3D arrow, or an arrow with text, for example. A tone or visual indicator may be used to teach the host certain commands so that they become more learned. Tactile feedback may be used so doesn't require sound or video for control. It is preferable to have the host perceive commands but without affecting the host's experience.

The phone/camera/etc. may be affixed or hovering above the host, such as with a drone. The player ultimately has a mental connection, inciting particular parts of the brain. In one embodiment, the game platform at the player end comprises one or more displays, speakers, and controls, allowing for frequently used instructions to be faster. Directional controls are an example of high frequency controls, which thus require as simple an interface as possible. Buttons for a momentary form of communication may be utilized, with sensitivity to control an amount, and a latching mechanism. Also a spot on the button to indicate direction may be utilized. For example, a player may press the top of a button to indicate to the host to move forward, and other characteristics of the motion may be used to indicate a speed, such as by swiping quickly upward to indicate to the host to run. Rotating cameras, 360° cameras, or a neural network capable of synthesizing views can also be used to allow real-time perspective changes without requiring the movement of the host. In a seamless embodiment, direct brain stimulation is used for transmitting visual stimuli and feedback control.

A "Do" button, in the joystick 203 or other control such as the input device 201 or the game controller 205, may be utilized for the most logical action presented, such as to open a door or push a crosswalk button that the host has approached. This provides instructional compression, which frees the player from using a cumbersome interface for high frequency instructions. However, this can lead to frustration where the desired action is not the first logical action, such as where the player wanted the door locked instead of opened. For these situations, a "?" Button may be utilized to open up an audio dialog or a menu of possible actions, for example.

The player can use the action buttons in various ways to quickly communicate their intent. The player can press and hold the "Do" button to access richer commands. The game platform should not limit what the player can do and accessing these commands can be cumbersome. Therefore, categorizing and sub-setting of commands may be utilized. Categorizing comprises selecting one selectable aspect that then opens up a list of possible actions for that aspect. For example, a body part, such as a hand, may be tapped on the screen, which then opens up options such as throw, grab, or push, and selecting a foot may open up a list of options such as jump, kick, or walk. Also, categories may be alphabetical, with the actions sorted by letter, but not limited to these forms of categorization.

Motions may be utilized by the player to indicate actions to the host, such as a swipe indicating a desired throw or jump, for example. Emojis may be utilized to indicate an emotional state.

Sub-setting may comprise bringing up a subset of options when presented with an object or location. For example, upon approaching a door, a list of actions relating to the door may be provided to the player. Object recognition in the game platform 200, in the player device 210 and/or host device 220, or a remote device, may be utilized to detect such structures. A dataset connects objects to actions and supplies them to the player. Alternatively, the player may tap an object on the screen, which then provides a list of options. Also, atypical or nonsensical actions may be included for entertainment purposes, such as for example smelling a door. A random button may be included for random actions that may be selected by the player for the host.

Moderation of the actions may be used to prohibit anything unlawful, uncomfortable for the host, improper, or against societal norms, for example. In addition, the host may have a reject button or similar input to indicate to the player that they do not want to, or cannot, take the requested action. If a player continues to request improper actions, they may be banned from the game, and proper behaviors may be encouraged with incentives.

Customizing controls—controls may be customized depending on the style of game play, in that the number of commands that can be captured, as well as rate of interaction, may be configured depending on the action of the game. For example, a sports game has a high rate of action, so controls need to be in front of player with no room for a menu or slow actions. So, in that style, for example, two buttons for left and right and a combined directional control for different punches in a boxing or martial arts type of game. This is in contrast to a strategy game, like escaping from a room with puzzles to solve with non-intuitive objects, meaning less of a requirement for fast controls but with more breadth of controls.

Action sub-setting—more in-depth actions. An adventure game is an example of using sub-setting—a movement, attack, and a pickup action, and then maybe "use" of what was picked up, such as a key that was picked up can then be used to unlock a door, for example.

Options for style of game play, such as camera angles and camera positioning for streamed embodiments are having the camera face outward, toward the person, split screen, multi-camera viewing that switches to other cameras, or drone based cameras, for example.

Set design—the range from physical world to digital world—the humaning platform may be in the real world but with digital world additions. A living room may be used as a boxing ring, for example, but with the ropes superimposed on the screen. Physical objects may be placed in the area in preparation of a game and digital set design would mean placing objects visually in the real world based on location, for example, scene recognition, GPS or other geolocation technology, etc. Other embodiments comprise a digital key or coin, base, or goal to reach. With real time video processing, the system may take the input video and stylize as the player desires—change the walls, to put the host in a comic book setting, etc.

State triggering—a special command may be available on either the host or the player side where, for example, a player may want to make a sudden and unexpected change to the state of the game, so a special command may be available for such a change. For example, if the host thought the game had been too uneventful and wanted a dragon to pop out, they could press a button relating to state triggering, and a dragon appears.

Changing the game state, for example to change levels, is accomplished either automatically, and/or user initiated. Automatic game state changes can occur based off of gaming metrics like number of points, host location, time remaining, number of players, upon accomplishing of goals, etc. User initiated state changes can require input from either the player or the host via a button, command or other form of input. Both user initiated and automatic state changes can also occur simultaneously such as when a player enters a location and the host decides to advances the gaming narrative to the next phase.

With respect to the application interface, the fundamental parts of this interface are the host interface and a marketplace where a user can select what game they want to play. Capabilities may be optimized for the experience of the players and the host. A user may see games, ratings, previews, screenshots, and may allow for game suggestions from players or hosts, that can then be filled by hosts, and include payment structures, suggested by the marketplace.

Costume play may be incorporated into the ecosystem for people that like to dress up as comic book characters, animals, etc. and the system allows them to be that character. Alternatively, the host's appearance may be enhanced with physical and/or digital characteristics like outfits, weapons, etc. as seen by the player on the player device 210.

Scoring may be based on the objective of the game and can be triggered by the host themselves, the player, other players, or automatically detected.

In addition to gaming, the ecosystem can request or control an action that the player would like, but can be more utilitarian instead, such as in a delivery or pick up something at a store for them. For example, a player may direct a host through a store or shopping mall, to one or more desired objects, or imply to browse through the store or stores. This may be particularly useful for persons that have limited mobility. Special projects—someone needs to people watch for marketing purposes and can send one or more hosts over to a mall, for example, to observe shopping activities at a particular store.

The gaming platform also has therapeutic purpose. For example, people that suffer from certain psychological conditions where social situations create a lot of anxiety, may be helped by controlling another person while still in a safe isolated environment, so that they may build experience with social interaction. Also depressed individuals may benefit from the interactions enabled by humaning through positive and entertaining interactions with others.

In operation, a host may wear and/or carry the host device 220, camera 213A, and sensors 215 while in a scene or environment, as shown in FIG. 2. The visual and physical aspects of the scene may be captured and/or sensed by the host device 220, camera 213A, and sensors 215 to be communicated to the network 121 to the player device 210. The player may control the host using the player device 210 and input device 201, joystick 203, and/or game controller 205. As the host encounters structures and/or people in their environment, the player may dictate responses to the host using the device player and communicated to the host device 220 via the network 121.

Commands may include positional change instructions or specific actions to be taken by the host, such as moving in a desired direction at a desired speed, pick up an object, or speak to another person nearby, for example. Audible and/or visual commands may be utilized to provide these commands to the host. An audio/visual command may comprise, for example, an image of the scene being displayed on the host device 220 with a target location marked and an audio command may be played "Ride the bike to the tree while singing your favorite song." The host may then, assuming these actions are within the established guidelines, take these actions, with video captured by the camera 213A being displayed on the player device and audio of the host singing captured by one or more microphones in the host device 220 being played on the player device 210. Once this action is performed, points may be awarded, which may be accrued until a level is reached and different actions may then become available, for example. If the commands made by the player are not within guidelines, for example if the bicycle is not owned by the host and the action could be considered theft, the host may indicate to the player that the command is rejected.

The network 121 provides communication between the player device 210 and the host device 220 and may include one or more cellular services and one or more WiFi networks, for example, for communicating over the Internet between devices. Accordingly, the network 121 provides a communication path for audio/visual data, as well as sensor and text data between devices.

Figure 3:
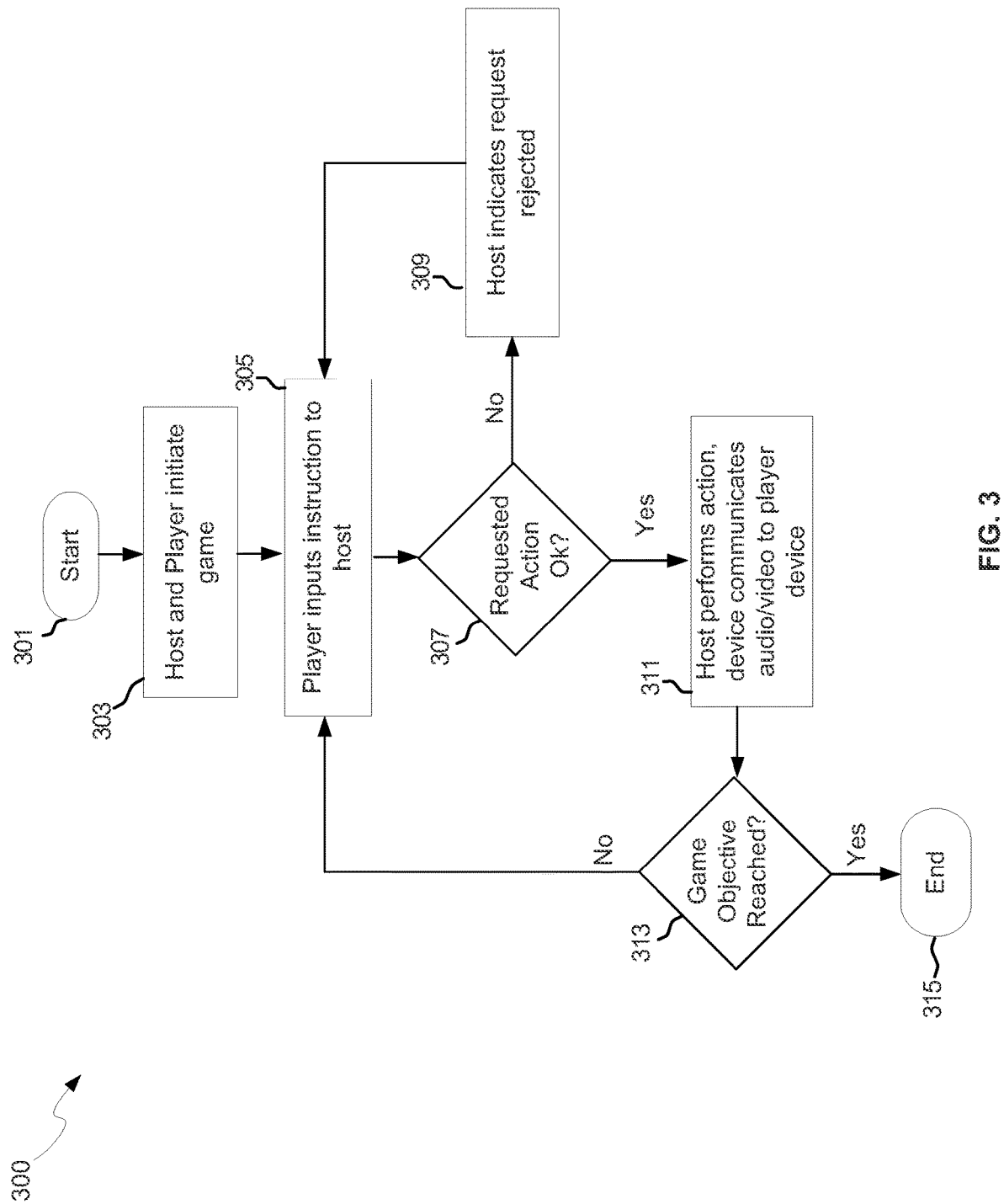
FIG. 3 is a flow chart for an interactive gaming platform, in accordance with an example embodiment of the disclosure.

FIG. 3 is a flow chart for a personal interaction game platform, in accordance with an example embodiment of the disclosure. Referring to FIG. 3, there is shown process flow 300 starting with start step 301 followed by step 303 where a host and a user agree to a humaning game. Once started, the player inputs one or more instructions to the host in step 305. If, in step 307, the requested action is not prohibited and is otherwise acceptable to the host, the process continues in step 311, where the host performs the action. The host device may send audio/video and other sensor data to the player device via the network so that the player experiences as much of the scene as possible. If, in step 307, the player instruction is prohibited, not possible, or otherwise not acceptable to the host, a rejection indication may be communicated to the player moving back to step 305, where one or more different instructions may be input. The player can request again and/or make an offer in order to get the action performed which may include a financial payment.

If after step 311, in step 313, the game objective has not been reached, the example steps proceed back to step 305 for more inputs, but if the game objective has been reached, the process ends at step 315.

Figure 4:
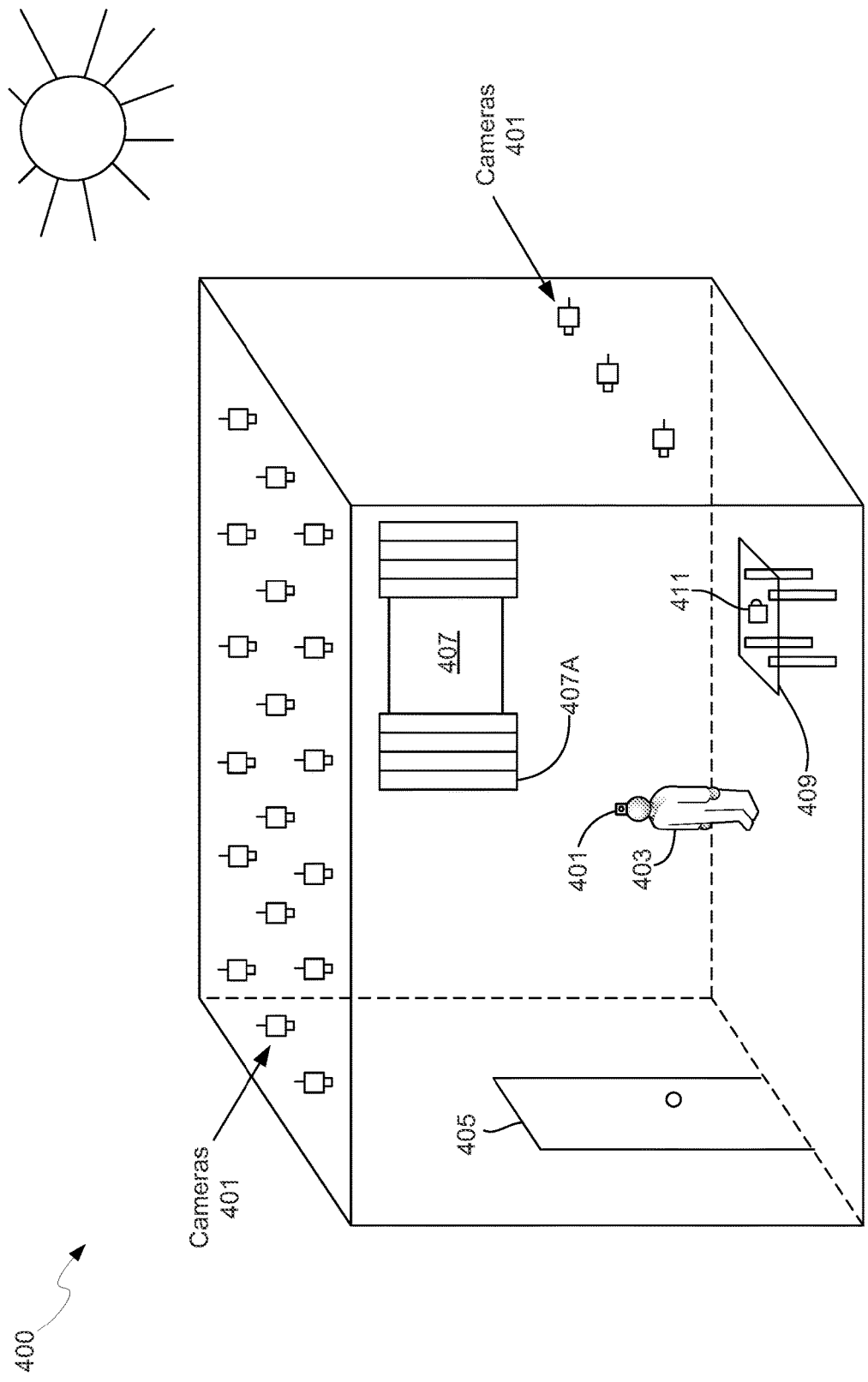
FIG. 4 illustrates an interactive gaming platform scene generation, in accordance with an example embodiment of the disclosure.

FIG. 4 illustrates a gaming platform interactive scene generation, in accordance with an example embodiment of the disclosure. Referring to FIG. 4, there is shown room 400 with cameras 401, a person 403, a door 405, a window 407 with curtains 407A, a table 409, and a cup 411. The cameras 401 may be operable to record images and video from the room 400 for subsequent scene generation.

In this regard, in various embodiments based on the present disclosure, recorded footage (e.g., captured images and/or videos) may be used in improving gaming platforms and applications, particularly for use in setting and training neural networks that are used in the gaming applications—that is, neural network based game engines. The recorded footage may be fed into a neural network, along with additional parameters and/or information, to enable the neural network to output frame(s) of video, which depends on the state and user controls, for use in the gaming applications. Some embodiments of the present disclosure may be directed to the gathering of the data as well as use of that data, such as to make an interactive section of video and/or to train a neural network, such as to make it fully interactive.

To that end, suitable settings, such as the room 400, may be used in conjunction with obtaining the recorded footage. In this regard, the room 400 comprises a scene (also referred to as "setting" or "environment") with objects and characters that may be interacted with by a game player. The scene (a slice of reality) may have a state—objects, characters, etc. Each state may have associated therewith a probability of being in that state. Further, to turn the scene into footage that may be used in a game, the scene may be digitized. For example, the scene may start out with a set, comprising static objects, such as the room 401 and window 407, for example, and dynamic objects, such as the curtains 407A that may move in the breeze, or the cup 411 that can be moved, or the door 405 that can be opened, closed, and/or locked. The movable items may have different states (e.g., door being open or closed) and probability of being in those states. For example, the cup 411 may be in different locations with different orientations. In such example scenario, the environment is mainly static with some dynamic motion possible, say the environment at the beach, some movement. Most cases may be fully static with objects in it.

To digitize the scene, the video capture may include and show the room 400 from every point in the room, and in every view/orientation, including roll, pitch, and yaw. In addition, for full reality, the capture should include additional information such as color information, which may help determine depth information. Ways of capturing this include, but are not limited to using 360 degree camera(s), moving camera(s) that may traverse (e.g., in back and forth pattern), or an array of cameras 401 as shown in FIG. 4. It should be noted that the number of cameras shown is merely an example, and more or fewer cameras may be used depending on the size of the room and/or parameters relating to the cameras, such as camera resolution and field-of-view, for example. Furthermore, a camera at every single height is not necessary, as different points-of-view may be generated from a subset.

In various embodiments, the recorded footage—e.g., acquired digital representation of the room 400—may be fed through a machine learning or artificial intelligence (AI) algorithm, to generate a dataset comprising one or more frames, and given any coordinate, the system may be operable to generate a view from there based on this dataset. A sparser version of the dataset may not necessarily have every point, but may have points of interest with interpolations between. In this regard, the footage may be recorded in sparse manner—that is, with gaps in time and/or space—but may be then converted to complete coverage, by filling in these gaps, such as using neural networks.

In some instances, objects may use more calculations to cover all possible locations, orientation, and/or motion, for example. In fixed point action, an interaction with an object (e.g., a door, a light switch, a gun, etc.) occurs from a fixed point. Such interaction may be recorded to capture what is being done with the object (e.g., opening the door, turning off the light switch, picking up the gun and/or using it to shoot, etc.). Thus, when moving to such fixed point, there would a recording of the action that may be undertaken with particular object at that point. For example, when opening the door 405, with two enemies present, different options may be filmed, whether the game player, represented by the person 403, shoots at them or not, closes the door, or runs away, etc.

Further, in the dataset, objects and/or environment may need to be able to maintain state, such as when the user picks up something and puts it back down or instead takes it with them, if the user, or other users look where it was, it needs to no longer be visible at that location. At a high level, inconsistencies may be avoided by recording the room with the object in its different states, which may also include different lighting with natural light through the window or with lights turned on at night.

In an example implementation, a ball on the floor might be best as a digital object as opposed to what may be achieved by other recordings. In addition to captured information, traditionally generated material may be also be added or removed. For example, a three-dimensional (3D) computer generated ball can be added to the floor, which moves when touched by the player. Similarly, a portion of the captured environment may be removed or modified to enhance the experience—e.g., similar to set extension in films.

Another layer of the dataset is characters, which of course can be fixed or moving around. Probability of states of characters may be calculated and captured from all angles. In this regard, in some instances, multiple cameras may be needed to fully capture the scene. One example is ballroom dancing, where it may not be practical to utilize one camera traversing the space as described above. In such cases, there may be a plurality of cameras spaced throughout the room, as shown in FIG. 4. Cameras affixed in the ceilings, walls, or possibly a swarm of drones, and may be fixed or slightly dynamic. With such an array, 3D imagery may be generated from them. In this regard, at least some of the cameras may be set up on a grid, to optimize operation.

As shown in FIG. 4, the cameras 401 may comprise 360 degree cameras spaced evenly on the ceiling, looking downward, and therefore may have views from all different angles. However, the disclosure is not limited to such implementations, and other solutions may be used—e.g., use of various combinations of camera(s) and mirrors to obtain full (or almost full), a mirror ball on the ceiling with a camera on the floor, rotating cameras, 360 degree cameras on robots or drones, etc. Images may then be captured from different points of interest and interpolate (e.g., using AI models) between all of them to get all the directions and locations. Further, in some instances AI models trained with geometric inference (which is what a human can do) may create a movie (e.g., a moving scene) using the captured images.

Transitions between cameras may be interpolated, and then it may be determined how to do the transitions. In this regard, while it may be possible to record and then playback, this may not be possible or convenient to do in a dynamic scene, thus it may be necessary to interpolate. This may be done by training in a neural network and then generalizing to show traversing the scene. For example, the cameras 401 may be configured to capture full range view(s)—that is, they may be 360 degree cameras, thus enabling producing views from various positions, and some (or all) angles. This information may be interpolated, such as using computer algorithms and/or machine learning techniques to provide seamless movement and/or novel perspectives.

In various embodiments, AI models may be used, such as in conjunction with the use of neural networks in generating the frames. Such AI models may be trained in the course of the training of the neural networks for video generation operations. The AI models may be configured for determining and/or predicting various aspects associated with features and/or objects of the environment, such as objects in the environment. Further aspects of the AI model comprise movement, occlusion, object rendering from different angles, lighting changes, looped dynamic movement (e.g., curtains 407A swinging)—can loop in each frame for accurate rendering. Different time steps may be utilized for different objects depending on their motion. The AI model may provide outside-in views, or character view facing outward. In another example scenario, the AI model may comprise interactive volumetric video, where an object and/or its movement may be recorded something somewhere else, then place in the environment. Similarly, face swapping may be enabled by this process, where another face, such as a famous actor, may be placed into the volumetric video of the character.

In an example embodiment, the AI model may train with geometric inference—going from a point and moving from it, such as placing a character at the table 409 and drawing the room from this direction. The coverage of the space may range from sparse to complete, based on neural network inference, which predicts the next frame given a certain frame. In this regard, images and related information may be captured in sparse manner—that is, providing sparse coverage, with gaps in time and/or space, and the footage may be then converted to complete coverage, such as using neural network based inference to fill in these gaps.

In some instances, neural networks and/or AI models may be configured to provide information relating to real time lighting. The neural networks and/or AI models may be configured to simulate camera movement, such as in a walking like manner. The neural networks and/or AI models may be configured to provide AI powered actions, movement, expression, speech, etc. The neural networks and/or AI models may be also configured to provide information relating to such parameters or characteristics as orientation in the X, Y, Z directions and rotations, time and state, surface properties, light interactions, etc.

In some instances, scanning techniques such as photogrammetry may be used to capture properties of a geometric element such as an object, a person, a scene, etc. These properties may include but are not limited to color, geometry, and/or other material properties. Following capture, these properties may be fed into a neural network to complete and/or augment data, such as in order to have a neural representation of the geometric element.

Geometric elements can include deformable and/or non-deformable time-dependent three-dimensional (3D) models, which make them dynamic. Examples include a snow ball, or a human character, which perform morphological changes when interacted with such as deformation when touched, as well as changes due to their own properties (e.g., the snow ball melting due to its temperature difference with the environment, the human character deciding to sit on a chair and remove its shoes, etc.).

In some instances, a robot (or other suitable autonomous moving objects) may be used to move around for capturing the environment and/or transmitting what is being captured live. When captured for use in a prerecorded experience, state and/or the properties associated with objects can be realistically tracked and simulated in a variety of ways. These can include but are not limited to using a database, data structure, recorded footage, footage of limited perspective (like that in traditional film), a plurality of footages of which one is chosen based on player interaction, computer vision algorithm, and/or neural network.

In some instances, the environment may be represented with particles and properties or equations such as those governing interactions of sub-atomic particles. In such embodiments, the output may be created by evaluating the equations or state of particles in order to create a simulated reality.

Figure 5:
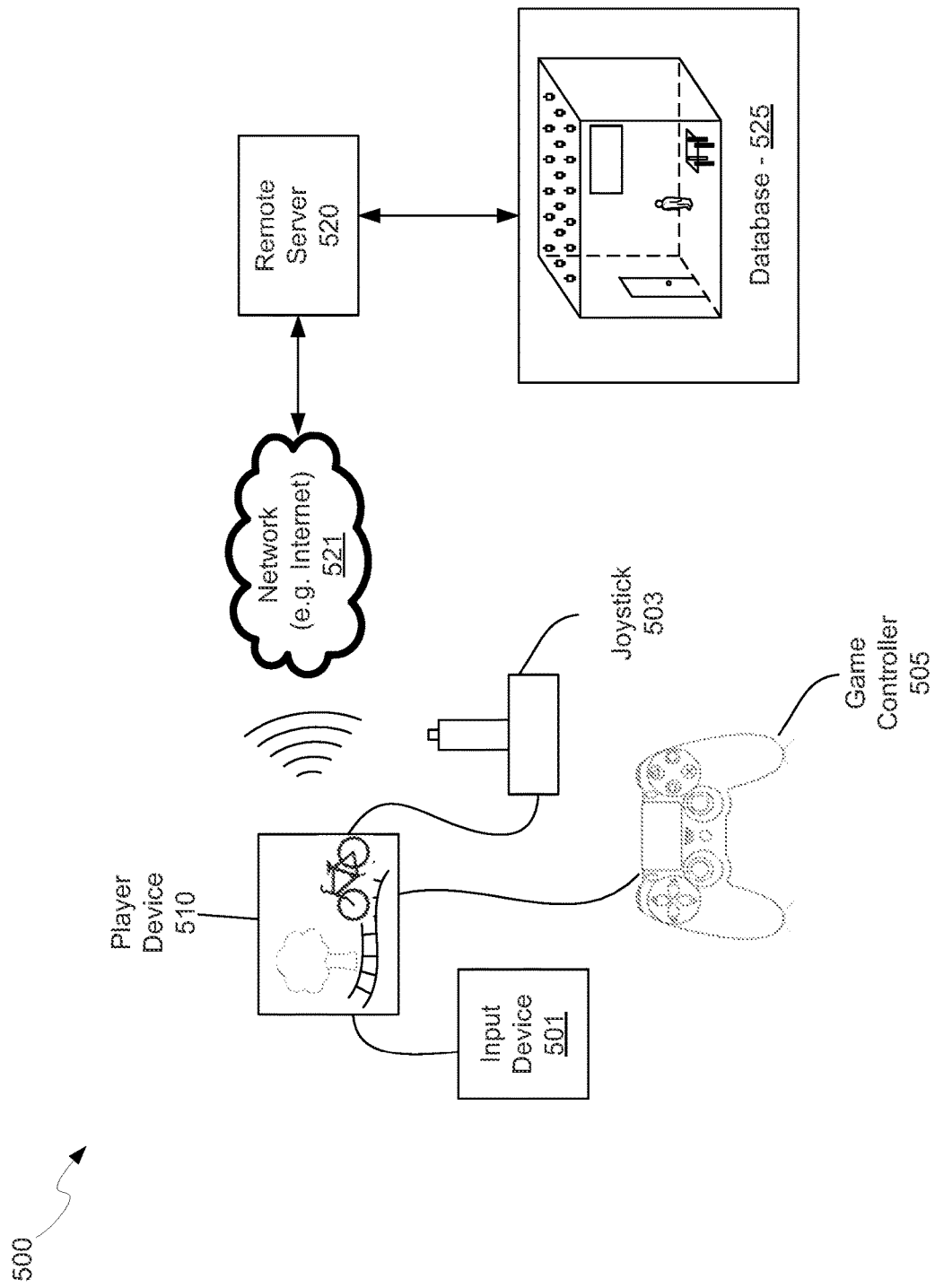
FIG. 5 illustrates an interactive gaming platform using a reality-based generated scene, in accordance with an example embodiment of the disclosure.

FIG. 5 illustrates an interactive gaming platform using a reality-based generated scene, in accordance with an example embodiment of the disclosure. Referring to FIG. 5, there is shown is a gaming platform 500.

The gaming platform 500 may be substantially similar to the game platform 200 of FIG. 2, and may generally operate and may be utilized in substantially similar manner—particularly with respect to facilitating and/or supporting gaming related operations and functions—as described above with respect to FIG. 2, for example. However, the gaming platform 500 may be configured for supporting interactive gaming using reality-based generated scenes, particularly based on use of artificial intelligence based processing (e.g., neural networks) as described herein for scene generation.

As illustrated in FIG. 5, the gaming platform 500 comprises a player device 510 and a network 521. The player device 510 is shown with an input device 501, a joystick 503, and a game controller 505, although other accessories are possible. In this regard, unless described otherwise, similarly named components are substantially similar, and may operate in substantially similar manner. There is also shown a remote server 520, which may maintain and/or interact with a database 525. The player device 510 may communicate with the remote server 520 via the network 521. The database 525 may comprise recorded images and videos, and/or related information, as described herein.

In operation, the player device 510 may be utilized for gaming based applications. In such instances, during such gaming applications, the player device 510, and the gaming platform 500 as a whole, may provide reality-based generated scenes, particularly based on use of artificial intelligence based processing (e.g., neural networks) as described herein for scene generation. In this regard, scenes displayed during games, and/or visual and physical aspects thereof, may be generated based on recorded footage (e.g., pictures and/or videos) captured in suitable environment, such as the room 400 of FIG. 4. This recorded footage, and/or information relating thereto, may be maintained in the database 525. The recorded footage may enable generation of sequence of frames for display during the gaming applications. As noted, artificial intelligence based processing, particularly use of neural networks, may be used for such scene generation. This may be done in one or both of the player device 510 and the remote server 520.

Accordingly, during gaming operations, the player device 510 may (but is not required to) communicate with the remote server 520, via the network 521, to obtain recorded footage from the database 525 and/or scenes generated based therein via the remote server 520. In this regard, The network 521, similar to the network 121, may provide communication between the player device 510 and the host device 220, and may similarly include one or more cellular services and one or more WiFi networks, for example, for communicating over the Internet between devices. Accordingly, the network 521 provides a communication path for audio/visual data, as well as sensor and text data between devices.

Figure 6:
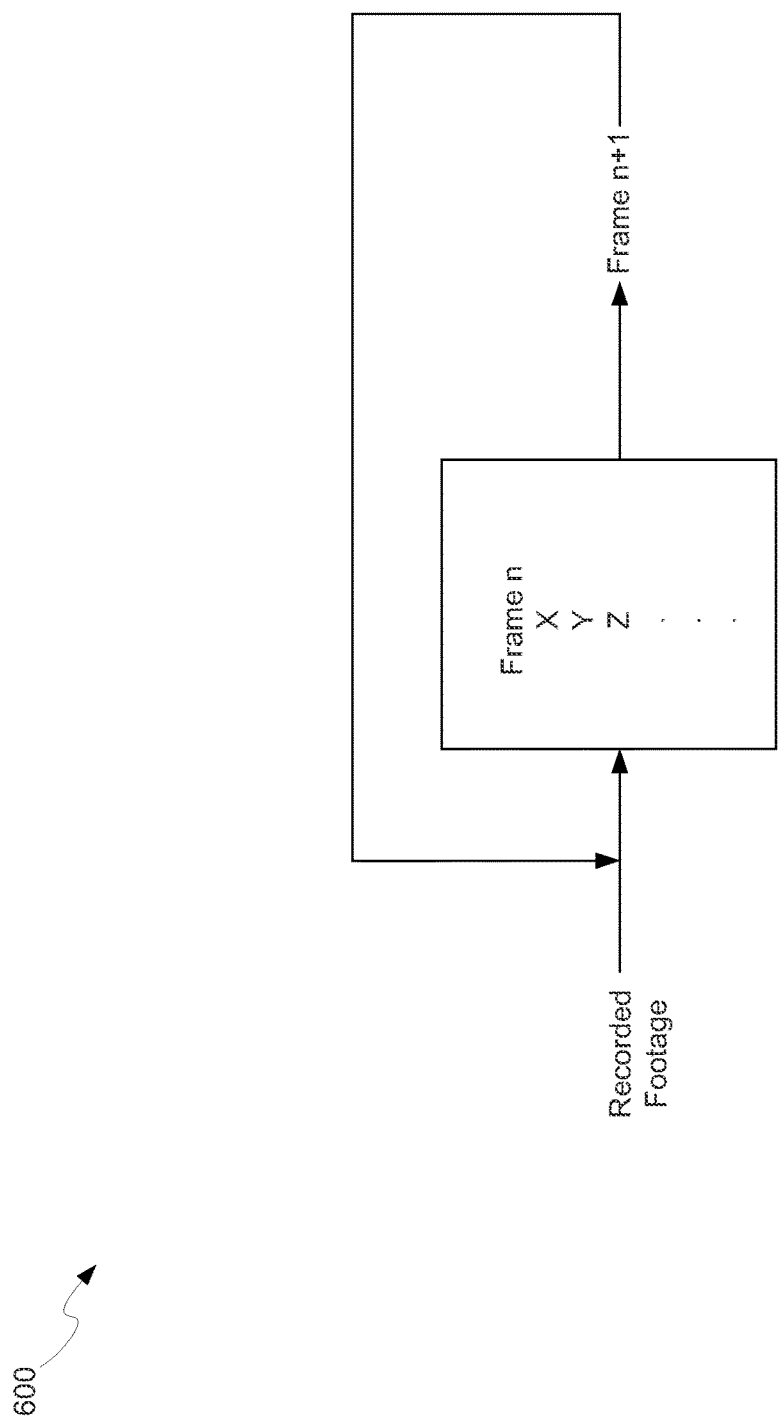
FIG. 6 illustrates a flowchart of machine learning scene generation, in accordance with an example embodiment of the disclosure.

FIG. 6 illustrates a flowchart of machine learning scene generation, in accordance with an example embodiment of the disclosure. Referring to FIG. 6, there is shown is a neural network 600 and an example use thereof in generating video frames.

In this regard, in accordance with embodiments based on the present disclosure, recorded footage may be fed into neural networks, such as the neural network 600, to enable training thereof, so that the neural networks may output video frames in interactive manner, as described herein. In this regard, once trained, the neural network may generate images and/or video frames, such as for use in gaming applications. The neural network 600 may be generated and continually trained, such as using captured images or videos (e.g., using room 400 of FIG. 4). Once trained, as illustrated in FIG. 6, the neural network 600 may generate subsequent video frames (e.g., frame n+1) based on current (prior) frames (e.g., frame n). In this regard, recorded footage may be fed into neural network 600, which may then output a frame of video that depends on the current frame and state variables, but with adjustments thereto being made by neural network 600 based on training. As described herein, the neural network 600 may use AI modeling for determining adjustments relating to placement and/or movement (e.g., with respect to orientation in the X, Y, Z directions), time and state, occlusion, surface properties, object rendering from different angles, lighting changes and/or interactions, players, looped dynamic movement, etc. The neural network 600 may then apply the adjustments when outputting the subsequent frames.

An example method, in accordance with the present disclosure for gaming comprises: in a gaming platform comprising at least a user device that comprises or is coupled to a display: obtaining recorded footage associated with an environment pertinent to a game playable via the user device; generating, based on the recorded footage, one or more video frames for use during playing of the game via the user device; and displaying the one or more video frames via the display during the playing of the game via the user device; wherein: the recorded footage is processed using artificial intelligence; and the one or more video frames are generated using the artificial intelligence and based on the processing of the recorded footage.

In an example embodiment, the method further comprises capturing the recorded footage in a physical setting that comprises and/or simulates the environment.

In an example embodiment, the method further comprises capturing the recorded footage in the physical setting using one or more cameras.

In an example embodiment, the method further comprises capturing the recorded footage using a plurality of cameras placed for optimal coverage in the physical setting.

In an example embodiment, the method further comprises obtaining information relating to the recorded footage, and/or relating to at least one object or feature in the environment.

In an example embodiment, the processing of the recorded footage and the generating of the one or more video frames via the artificial intelligence comprises use of a neural network.

In an example embodiment, the processing of the recorded footage and the generating of the one or more video frames via the artificial intelligence comprises use of artificial intelligence (AI) based model.

In an example embodiment, the method further comprises configuring and/or training the artificial intelligence (AI) based model based on the recorded footage.

In an example embodiment, the gaming platform further comprises a remote server, and further comprising performing at least a portion of the processing of the recorded footage and/or the generating of the one or more video frames in the remote server.

In an example embodiment, the method further comprises maintaining via the remote server a database, and storing the recorded footage via the database.

An example system, in accordance with the present disclosure, for gaming comprises: in a gaming platform comprising at least a user device that comprises or is coupled to a display, the gaming platform being configured to: obtain recorded footage associated with an environment pertinent to a game playable via the user device; generate, based on the recorded footage, one or more video frames for use during playing of the game via the user device; and display the one or more video frames via the display during the playing of the game via the user device; wherein: the recorded footage is processed using artificial intelligence; and the one or more video frames are generated using the artificial intelligence and based on the processing of the recorded footage.

In an example embodiment, the gaming platform is further configured to capture the recorded footage in a physical setting that comprises and/or simulates the environment.

In an example embodiment, the gaming platform further comprises one or more cameras configured to capture the recorded footage in the physical setting.

In an example embodiment, the gaming platform further comprises a plurality of cameras placed for optimal coverage in the physical setting.

In an example embodiment, the one or more cameras comprise at least one of a 360 degree camera, a moving camera, or a camera deployed on a drone.

In an example embodiment, the gaming platform is further configured to obtain information relating to the recorded footage, and/or relating to at least one object or feature in the environment.

In an example embodiment, the processing of the recorded footage and the generating of the one or more video frames via the artificial intelligence comprises use of a neural network.

In an example embodiment, the processing of the recorded footage and the generating of the one or more video frames via the artificial intelligence comprises use of artificial intelligence (AI) based model.

In an example embodiment, the gaming platform is further configured to train the artificial intelligence (AI) based model based on the recorded footage.

In an example embodiment, the gaming platform further comprises a remote server configured to perform at least a portion of the processing of the recorded footage and/or the generating of the one or more video frames in the remote server.

In an example embodiment, the remote server is further configured to maintain a database, and to store the recorded footage via the database.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for gaming, the method comprising:
   in a gaming platform comprising at least a user device that comprises or is coupled to a display:
   obtaining recorded footage associated with an environment pertinent to a game playable via the user device;
   generating, based on the recorded footage, one or more video frames for use during playing of the game via the user device; and
   displaying the one or more video frames via the display during the playing of the game via the user device;
   wherein:
   the recorded footage is processed using artificial intelligence; and
   the one or more video frames are generated using the artificial intelligence and based on the processing of the recorded footage.

2. The method according to claim 1, further comprising capturing the recorded footage in a physical setting that comprises and/or simulates the environment.

3. The method according to claim 2, further comprising capturing the recorded footage in the physical setting using one or more cameras.

4. The method according to claim 3, further comprising capturing the recorded footage using a plurality of cameras placed for optimal coverage in the physical setting.

5. The method according to claim 1, further comprising obtaining information relating to the recorded footage, and/or relating to at least one object or feature in the environment.

6. The method according to claim 1, wherein the processing of the recorded footage and the generating of the one or more video frames via the artificial intelligence comprises use of a neural network.

7. The method according to claim 1, wherein the processing of the recorded footage and the generating of the one or more video frames via the artificial intelligence comprises use of artificial intelligence (AI) based model.

8. The method according to claim 7, further comprising configuring and/or training the artificial intelligence (AI) based model based on the recorded footage.

9. The method according to claim 1, wherein the gaming platform further comprises a remote server, and further comprising performing at least a portion of the processing of the recorded footage and/or the generating of the one or more video frames in the remote server.

10. The method according to claim 9, further comprising maintaining via the remote server a database, and storing the recorded footage via the database.

11. A system for gaming, the system comprising:
    in a gaming platform comprising at least a user device that comprises or is coupled to a display, the gaming platform being configured to:
    obtain recorded footage associated with an environment pertinent to a game playable via the user device;
    generate, based on the recorded footage, one or more video frames for use during playing of the game via the user device; and
    display the one or more video frames via the display during the playing of the game via the user device;
    wherein:
    the recorded footage is processed using artificial intelligence; and
    the one or more video frames are generated using the artificial intelligence and based on the processing of the recorded footage.

12. The system according to claim 11, wherein the gaming platform is further configured to capture the recorded footage in a physical setting that comprises and/or simulates the environment.

13. The system according to claim 12, wherein the gaming platform further comprises one or more cameras configured to capture the recorded footage in the physical setting.

14. The system according to claim 13, wherein the gaming platform further comprises a plurality of cameras placed for optimal coverage in the physical setting.

15. The system according to claim 11, wherein the one or more cameras comprise at least one of a 360 degree camera, a moving camera, or a camera deployed on a drone.

16. The system according to claim 11, wherein the gaming platform is further configured to obtain information relating to the recorded footage, and/or relating to at least one object or feature in the environment.

17. The system according to claim 11, wherein the processing of the recorded footage and the generating of the one or more video frames via the artificial intelligence comprises use of a neural network.

18. The system according to claim 11, wherein the processing of the recorded footage and the generating of the one or more video frames via the artificial intelligence comprises use of artificial intelligence (AI) based model.

19. The system according to claim 18, wherein the gaming platform is further configured to train the artificial intelligence (AI) based model based on the recorded footage.

20. The system according to claim 11, wherein the gaming platform further comprises a remote server configured to perform at least a portion of the processing of the recorded footage and/or the generating of the one or more video frames in the remote server.

21. The system according to claim 20, wherein the remote server is further configured to maintain a database, and store the recorded footage via the database.

* * * * *